United States Patent [19]

Kubåt et al.

[11] Patent Number: 4,559,376

[45] Date of Patent: Dec. 17, 1985

[54] METHOD OF PRODUCING PLASTIC COMPOSITES FILLED WITH CELLULOSE OR LIGNOCELLULOSIC MATERIALS

[76] Inventors: Josef Kubåt, Solparksvägen 3, S-171 35 Solna; Tore C. F. Klason, P.1.2201, S-441 90 Alingsås, both of Sweden

[21] Appl. No.: 525,041

[22] PCT Filed: Dec. 10, 1982

[86] PCT No.: PCT/SE82/00422

§ 371 Date: Aug. 8, 1983

§ 102(e) Date: Aug. 8, 1983

[87] PCT Pub. No.: WO83/02118

PCT Pub. Date: Jun. 23, 1983

[30] Foreign Application Priority Data

Dec. 11, 1981 [SE] Sweden .............................. 8107444

[51] Int. Cl.$^4$ .......................... C08L 1/02; C08J 3/20; C08J 5/10
[52] U.S. Cl. ....................................... 524/13; 524/15; 524/16; 524/76; 524/78
[58] Field of Search ................. 524/9, 13, 15, 16, 35, 524/76, 78

[56] References Cited

U.S. PATENT DOCUMENTS

3,093,605 6/1963 Ayers ..................................... 524/15
3,305,499 2/1967 Bevans .................................... 524/9
3,645,939 2/1972 Gaylord ................................ 524/13

FOREIGN PATENT DOCUMENTS

298968 11/1927 United Kingdom ................ 527/103

OTHER PUBLICATIONS

Chemical Abstracts, Col. 72 (1970), abstract No. 134357s, Vanina V. I, Zakoshchikov A P (Mosk. Tekhnol. Inst. Moscow, USSR).
Chemical Abstracts, vol. 87 (1977), abstract No. 169399u, Charina M V (ural Lesotekh. Inst., Sverdlovsk, USSR).
Chemical Abstracts, vol. 90 (1979), abstract No. 73569k, Czech. 174362.
Derwent's abstract, No. 30579 C/17, SU 681 081.

Primary Examiner—John Kight
Assistant Examiner—Nathan M. Nutter
Attorney, Agent, or Firm—Cushman, Darby & Cushman

[57] ABSTRACT

A method to produce composites based on cellulose or lignocellulosic materials and plastics according to which method the cellulose or lignocellulose material is subjected to a pre-hydrolytic or other chemically degrading treatment prior to or during the compounding or processing step whereby a comminution and improved dispersion of the cellulose or lignocellulose material in the plastic phase is achieved.

7 Claims, No Drawings

METHOD OF PRODUCING PLASTIC COMPOSITES FILLED WITH CELLULOSE OR LIGNOCELLULOSIC MATERIALS

The focus on energy has had a significant impact on the growth of interest for fillers and extenders for plastic materials. It is known that such additives may influence the property profile of the final product or, in certain cases, act as pure extenders allowing a more efficient use of the plastic component. There are also instances where the filler may have a marked reinforcing effect.

Among the many types of fillers and similar additives, cellulose and various kinds of lignocellulosic materials take an important place. Especially interesting is the increasing use of such fillers in thermoplastics. Cellulose fibre, cellulose flour, wood flour, and nut shell flour are a few examples of additives to be discussed in the present context.

When the lignocellulosic or cellulose based material is used as powder or flour, it has to be ground prior to the compounding step. When used as fibres, such materials experience a certain grinding action in the plastics processing machinery, but, this effect is, however, of little practical significance. Fibrous additives/fillers of the above mentioned type are normally expected to possess a certain reinforcing effect reminiscent of that obtained with glass fibres or other similar reinforcement.

When using additives (fillers, reinforcements) of the present type difficulties are normally encountered in achieving a sufficient degree of dispersion during the compounding and processing steps, especially when the additive is fibrous. An acceptable dispersion is normally obtained only with finely ground material. When trying to achieve an acceptable dispersion with fibrous matter, the mixture has to be subjected to such an intense and repeated kneading action during the compounding stage, that the time and energy consumed in that stage make such an approach prohibitive.

Such an energy consuming comminution of the cellulosic or lignocellulosic additive in the compounding step, for instance by repeated treatment in a kneader, fulfills no proper technical task, as it could have been done easier by grinding the filler prior to compounding. On the other hand, it is believed that an excessive comminution of the fibrous filler should be avoided, on the assumption that the reinforcing action would be lost.

When investigating the effect of cellulosic and lignocellulosic fillers on the property profile of thermoplastic composites, we have surprisingly found that the particle size of the filler/reinforcing agent plays a minor role only, implying that the reinforcing effect of such fillers, when present in fibrous form, is not more pronounced than that of finely divided particulate matter. This finding has an important practical implication, as it justifies the use of finely divided fillers which are easy to disperse in the plastic matrix.

The aim of the present invention is the use of easily disintegrable pre-hydrolysed cellulosic or lignocellulosic material as additive to plastics, preferably thermoplastics. It is known that a pre-hydrolysis of such materials results in a substantial embrittlement. This embrittlement is utilized in the present invention in the compounding stage, where the pre-hydrolyzed material is added to the plastic component without prior grinding or other comminution. The comminution to the final particle size takes place in the compounding machine or, directly, in the processing machine as an effect of the shear forces prevailing in such machines (kneaders, extruders, injection moulding machines, film blowing equipment etc.). The pre-hydrolysis of the additive thus eliminates the necessity of the normal time and energy consuming mechanical comminution prior to the compounding step.

It is understood that the additive has a suitable particle size before being subjected to the hydrolytic embrittlement. To illustrate this point, we may refer to our experiments where normal wood flour, particle size 0.1–0.5 mm, or about 2×2 cm large pieces of cellulose pulp sheets have undergone hydrolytic degradation, whereafter they were directly fed into the compounding equipment (Buss Ko-Kneter type PR46, diameter 46 mm L/D 11) producing a well dispersed compound which was easily processed on an injection moulding machine. Similar experiments with the addition of same materials which have not undergone any hydrolysis produced a composite with a poor dispersion which, especially in the case of fibrous cellulose, was entirely unacceptable.

The pre-hydrolysis as such is a well-known method, for instance in the production of so called microcrystalline cellulose. Although literature data relating to the embrittlement by hydrolytic agents only refer to pure cellulose, we found that the embrittlement which is a necessary element of the present invention can be achieved also with lignocellulosic materials such as wood flour of varying chemical composition, coarser wood particles, straw etc.

It is understood that the pre-hydrolysis of the filler component is carried out by the action of suitable chemical agents. Normally, inorganic acids in dilute aqueous solutions fulfill this task properly, the concentration, and time and temperature of treatment depending on the chemical nature of the filler. Also organic acids as, for instance, formic or oxalic acid, various aromatic sulphonic acids may be used. Some acidic substances, as hydrogen chloride or hydrogen fluoride, may bring about the hydrolyzing action in gaseous form. This has an important practical advantage in that the hydrolytic embrittlement may be carried out without using a wet method, thus eliminating the drying step. The gaseous agent, such as hydrogen chloride or hydrogen fluoride, can be easily driven off by air or other inert gas, at normal or elevated temperatures, or by simple heating. When required, remaining acidity may be eliminated by suitable neutralization. This applies to all types of acidic hydrolysis. In certain cases, the hydrolizing substance may be left in the filler without subsequent neutralization.

The embrittlement to be carried out before using the filler as component in the plastic matrix may also be achieved by other substances known to produce a hydrolytic attack on the substances considered here. As examples of such substances may be mentioned alkaline solutions or gases. Also in this case, the substance remaining in the filler after the treatment may be neutralized when necessary.

The effects intended in the present invention can also be achieved by treating the filler with acidic salts at suitable conditions of temperature and time of treatment, an example of such a substance being hydrogen potassium sulphate.

Also substances known to split off acidic components at elevated temperature or after having reacted with the cellulosic or lignocellulosic material may be utilized in the present context. An example is cyanuric chloride which, upon reacting with the hydroxyl groups of cellulose or lignin, splits off hydrogen chloride which produces the embrittling attack on the filler.

The list of substances which may be used in the sense of the present invention also contains metallic salts known to produce degradation of the fillers in question in the presence of oxygen. Also ozone treatment has a similar effect.

It is understood that not only the types of substances exemplified above may be used according to the present invention, but also suitable mixtures of such substances, as well as combinations of the various methods of treatment.

It is further understood that the liquid vehicles used to carry out the heterogeneous pre-hydrolysis may be water or any other liquid. Non-aqueous solvents as, for instance, liquid sulphur dioxide, liquid ammonia or organic solvents, have often the advantage of needing less thermal energy when the product is to be dried.

It is to be stressed that the pre-hydrolyzed material after washing, neutralization and drying may be directly used as filler which attains the final degree of comminution to a finely divided matter in the processing equipment. In certain cases, the mixture of filler and plastic may be fed directly into the processing machinery without prior homogenisation in the compounding stage.

When the product to be processed so allows, the hydrolytic agent may be left in the filler. This in, for instance, the case with certain organic acid as formic or oxalic acid. It is also possible to arrange the process so that the remainders of the hydrolyzing agents may be driven off in the venting arrangement of the compounding or processing machinery (injection moulding machines, extruders etc. equipped with vented screws).

The comminution in the compounding and/or processing machinery is, obviously, carried out at a substantially lower energy consumption that if it were necessary to perform the comminution without the beneficial action of the hydrolytic attack. In this sense, cellulosic or lignocellulosic fillers pre-hydrolyzed according to the present procedure may be termed self-comminuting.

EXAMPLES of hydrolytic pre-treatment in order to attain a high degree of self-dispersion of cellulosic or lignocellulosic fillers in normal processing of filled thermoplastics Bleached spruce sulphate pulp was treated with 5% aqueous hydrochloric acid at room temperature for 10 hours. After washing and drying, the material could be easily converted to a fine powder by gentle mechanical action. Similar results were obtained with 5% or 10% sulphuric acid. The time of treatment could be reduced down to minutes by increasing the temperature to 70° C.

Also unbleached spruce sulphate and sulphite pulp was easily converted to fine powder by the above procedure.

The same was true of wood flour of different origin, both from conifers and deciduous species. The fibrous structure remaining in normally available wood flour disappeared entirely after the hydrolytic treatment.

Easily powderized matter was also produced by treating bleached and unbleached pulps and wood flour of different origin by treatment with dilute solutions of cyanuric chloride in ethyl alcohol, drying to a final content of cyanuric chloride of 2% in the filler and heating to 120° C.

In order to test the dispersability of the pre-hydrolyzed matter during processing of the corresponding composites, injection moulding experiments were performed with high density polyethylene as the matrix material. In these experiments, a mixture of 60% high density polyethylene (Unifos DMDS 7006) and 40% pre-hydrolyzed (5% hydrochloric acid) bleached spruce sulphate pulp was compounded in a Buss Ko-Kneter (type PR46, screw diameter D=46 mm, L/D 11) and the homogenized mixture injection moulded using a conventional machine (Arburg 22 IE/170 R).

It was found that the cellulosic component exhibited a high degree of dispersion, the average particle size being 30 $\mu$m. It is to be remarked that the pre-hydrolyzed pulp was fed with the HDPE component into the compounding machine in the form of $2 \times 2$ cm$^2$ large pieces (thickness 2 mm). Tensile testing of the mouldings (tensile testing bars, DIN 53455, dimensions area $10 \times 3,5$ mm$^2$, length 150 mm) gave the following result:

tensile strength: 21 MPa
breaking elongation: 6.7%
tensile modulus: 2700 MPa
impact strength: 20 kJ/m$^2$ (charpy, unnotched)

Experiments with untreated pulp gave lower values of the above parameters, especially the breaking elongation which was about 1% only. Mainly, however, the dispersion was entirely insufficient.

Measurements were also done on corresponding compounds containing commercial microcrystalline cellulose (Mikrocell, Avicel PH 102, average size 50 $\mu$m, and Avicel PH 105, average size 20 $\mu$m). In this case the modulus was around 1800 MPa, the tensile strength around 13 MPa and the breaking elongation 2–3%. The impact strength was ca. 18–19 kJ/m$^2$. All results relate to samples conditioned at 50% rel. humidity and 23° C. The strain rate of the testing machine (Instron, type 1193) was 10 mm/min.

These findings support the ideas underlying the present invention in that they show that it is not necessary to retain the fibrous structure of cellulosic fillers in order to obtain an reinforcing effect in the composite. On the contrary, due to poor dispersion of such fibrous fillers, they have a detrimental effect on the property profile. Another effect clearly shown by the above findings is the feasibility of easily attaining a high degree of self-comminution of pre-hydrolyzed cellulosic fillers in normal processing equipment.

To supplement the above findings experiments were also carried out with injection moulding of HDPE filled with 40% of spruce wood meal. A slight improvement in the mechanical property profile was noted when using prehydrolyzed meal. The main finding, however, was a substantial reduction in particle size and a better dispersion.

An important consequence of the self-comminuting effect discussed above is the possibility to incorporate larger amounts of the filler into the plastic matrix. In a series of experiments 70% of prehydrolyzed bleached sulphate pulp was incorporated into polypropylene (ICI GYM 121), to be compared with 50% of the untreated pulp, and 60% of the corresponding cellulose meal having an average particle size of 70 $\mu$m.

In the light of what has been said above it thus appears clear that the present invention solves an important problem in connection with using cellulosic or lignocellulosic fillers in plastics, in the first hand thermoplastics, that is to say the problem with achieving a satisfactory dispersion of the filler particles in the plastic matrix. At the same time, an improvement of the mechanical property profile is achieved.

A particularly interesting instance of the difficulties associated with the improper dispersion of the filler is encountered in the recovery of plastic waste containing paper. Such waste is recovered from municipal refuse; it is also found in plants for the manufacture of laminated packaging materials based on, for instance, polyethylene and paper. In such cases, the present method provides an efficient means in converting such waste into well dispersed composites.

We claim:

1. A method of producing plastics composites containing cellulose or lignocellulose material in a plastics matrix, said method comprising the successive steps of:
   (1) subjecting the cellulose or lignocellulose material to pre-hydrolytic chemical degradation, and thereafter
   (2) incorporating the thus degraded cellulosic or lignocellulosic material into the plastics matrix thereby facilitating comminution and improved dispersion of the cellulosic or lignocellulosic materials in the plastic phase.

2. The method of claim 1 in which the plastics composite contains up to 40% by weight of the cellulose or lignocellulose material.

3. The method of claim 1 in which a masterbatch concentrate for plastics containing up to 70% by weight of the cellulose or lignocellulose material is prepared.

4. A method of producing a thermoplastic composite in which cellulose of lignocellulose materials are dispersed, said method comprising the successive steps of:
   (1) subjecting a cellulose or lignocellulose material to a pre-hydrolytic treatment to produce an embrittled easily disintegratable, self-comminuting material, and thereafter
   (2) incorporating the thus-treated material into the thermoplastic and subjecting the resulting mixture to shear forces thereby comminuting the treated cellulosic or lignocellulosic material and distributing same throughout the thermoplastic.

5. The method of claim 4 in which the cellulose or lignocellulose material is not subjected to grinding or comminution prior to the pre-hydrolytic treatment of step (1).

6. The method of claim 5 in which the thermoplastic composite contains up to 40% by weight of the pre-hydrolytic cellulose or lignocellulose incorporated therein.

7. The method of claim 5 in which a masterbatch concentrate is produced which contains up to 70% by weight of the pre-hydrolytic cellulose or lignocellulose incorporated therein.

* * * * *